United States Patent [19]

Althaus et al.

[11] Patent Number: 4,950,792

[45] Date of Patent: Aug. 21, 1990

[54] SUBSTITUTED P,P'-METHYLENE-BIS-ANILINES

[75] Inventors: Hans Althaus, Glis; Theodor Volker; Andreas Schmidt, both of Reinach, all of Switzerland

[73] Assignee: Lonza Ltd., Gampel/Valais, Switzerland

[21] Appl. No.: 206,920

[22] Filed: Jun. 9, 1988

Related U.S. Application Data

[63] Continuation of Ser. No. 77,735, Jul. 24, 1987, abandoned, which is a continuation of Ser. No. 853,880, Apr. 21, 1986, abandoned.

[30] Foreign Application Priority Data

Oct. 23, 1985 [CH] Switzerland ..................... 4562/85

[51] Int. Cl.$^5$ .............................................. C07C 87/60
[52] U.S. Cl. .................................. 564/335; 564/331; 564/333
[58] Field of Search ................. 564/330, 335; 525/453

[56] References Cited

FOREIGN PATENT DOCUMENTS 2177392  1/1987  United Kingdom ................ 564/335

Primary Examiner—Robert V. Hines
Attorney, Agent, or Firm—Fisher, Christen & Sabol

[57] ABSTRACT

New methylenebis(metachloro)anilines which are chain-lenghtening agents or cross-linking agents for polyurethanes.

4 Claims, No Drawings

SUBSTITUTED P,P'-METHYLENE-BIS-ANILINES

This is a continuation of application Ser. No. 077,735, filed July 24, 1987.

BACKGROUND OF THE INVENTION

1. Field Of The Invention

The invention relates to new Ames-test-negative chain-lengthening agents or cross-linking agents for polyurethane.

2. Prior Art

Production of polyurethanes according to the isocyanate polyaddition process is known. For example, compounds having reactive hydrogen atoms, such as polyesters with terminal OH groups, are reacted with diisocyanates to form a prepolymer (West German PS No. 1,240,654), which is then brought to reaction in a second step with a chain-lengthening agent or a cross-linking agent, usually an aromatic diamine. The resultant pourable reaction mass can then be cured in a mold over a prolonged period. It is essential that the prepolymers do not react too fast with the chain-lengthening agents or cross-linking agents so that an adequate processing time in the liquid phase is assured. Especially primary and secondary di- and poly-amines, preferably aromatic diamines, are the choice for this purpose.

It has been found that the best processing characteristics can be attained if a substitutent is in the ortho position on the amino group. With these compounds, most of all 4,4'-methylene-bis(2-chloroaniline), (MOCA), it is possible to obtain elastomers with particularly good properties with a good processing time [Wright et al., Solid Polyurethane Elastomers, p. 125, MacLaren, London, (1969)]. But a significant disadvantage of MOCA, which resulted in its being banned in some countries, is its carcinogenicity and mutagenicity, detected by the positive Ames test [Ames et al., Proc. Nat. Acad. Sci. USA, vol. 70, No. 3, pp. 782–786 and No. 8, pp. 2281–2285].

Further, in practice chain-lengthening agents have been used which have alkyl groups in the ortho position, including preferably diaminodiphenylmethanes alkyl-substituted in the ortho position, such as, 3,3',5,5'-tetraisopropyl-4,4'-diaminodiphenylmethane or 3,5-dimethyl-3',5'-diisopropyl-4,4'-diaminodiphenylmethane (West German OS No. 3,126,436). But with these amines the pot lives become so short that no reasonable processing time is any longer possible.

The opinion is widespread that the best results can be obtained only with amines as chain-lengthening agents or cross-linking agents which exhibit electron-attracting radicals, e.g., halogen radicals, in the ortho position [Hepburn, Polyurethane Elastomers, Appl. Science Publ. (1982) p. 57; Becher, Braun, Kunstoff Handbuch [Plastics Manual], Vol. 7, Polyurethanes, 2nd Rev. Ed. (1983), p. 100].

There was even a willingness to put up with poor toxicological data as well as considerable disadvantages in the temperature stability of individual o-halogenated compounds. Thus, in the case of MOCA, for example, the maximum working temperature is not to exceed 140° C. to avoid undesirable bubble formation by generation of gas in the product as a result of decomposition reactions.

BROAD DESCRIPTION OF THE INVENTION

The main object of the invention is to provide chain-lengthening agents or cross-linking agents that do not combine the above-mentioned disadvantages. Other objects and advantages of the invention are set out herein or are obvious herefrom to one ordinarily skilled in the art.

The objects and advantages of the invention are achieved by the composition of the invention.

It was unexpectedly found that, contrary to the widespread opinion, equally good, very often even better elastomer properties with equally advantageous processing times can be obtained with 4,4'-methylene-bis-anilines used as the chain-lengthening agents or cross-linking agents, which are o,o'-dialkyl substituted and halogen substituted in the meta position.

Further, it was possible to establish that the compounds according to the invention are extremely temperature-stable. Thus, most of such compounds could be heated to 350° C. (comparison of MOCA around 200° C.) without the occurrence of an exotherm. The maximum possible working temperature with the new compounds consequently is substantially higher than with the usual chain-lengthening agents (comparison with MOCA, 140° C.). If this temperature is not used, at least the safe, decomposition-free working temperature range is substantially greater than the prior art compounds.

In addition, the invention chain-lengthening agents or cross-linking agents are Ames-test-negative and are characterized by the general formula:

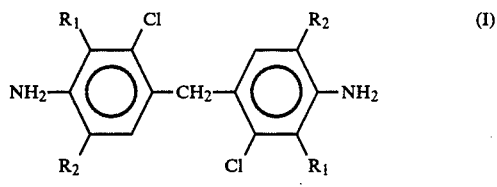

wherein each $R_1$ is the same or different, straight-chain or branched alkyl having 1 to 4 C atoms, and each $R_2$ is chlorine or the same or different, straight-chain or branched alkyl having 1 to 4 C atoms. The invention agents are new compounds which are not known so far in the literature.

Preferred chain-lengthening agents or cross-linking agents are those in the following list:
4,4'-methylene-bis(3-chloro-2,6-diethylaniline)
4,4'-methylene-bis(5-chloro-2-methyl-6-ethylaniline)
4,4'-methylene-bis(3-chloro-2-methyl-6-ethylaniline)
4,4'-methylene-bis(3-chloro-2-methyl-6-isopropylaniline)
4,4'-methylene-bis(3-chloro-2-methyl-6-sec-butylaniline)
4,4'-methylene-bis(2,5-dichloro-6-ethylaniline).

In particular, 4,4'-methylene-bis(3-chloro-2,6-diethylaniline is preferably used.

Production of the invention compounds advantageously takes place by starting with 3-chloroanilines of the formula:

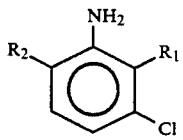

(II)

wherein R₁ and R₂ have the above-mentioned meanings, by reaction thereof with formaldehyde or agents yielding formaldehyde, in the presence of at least one strong inorganic acid.

Sulfuric acid or hydrochloric acid is advantageously used as the strong inorganic acid. But other strong inorganic acids are equally suitable. The amount of acid can vary over a wide range, but small amounts of acid cause longer reaction times and vice versa.

The ratio of the amount of formaldehyde, optionally produced from an agent yielding formaldehyde, to aniline is advantageously so selected that there is 0.4 to 0.6 mol, preferably to 0.45 to 0.5 mol, of formaldehyde per 1 mol of aniline. Formaldehyde as such is advantageously used in the form of its aqueous solution as formalin in a 20 to 40 percent concentrations. Paraldehyde, for example, can be used as the reagent splitting off the formaldehyde.

Usually the reaction is performed in the presence of at least one aprotic or protic solvents. Xylene or toluene, for example, can be used as the aprotic solvent; C₁ to C₄ alcohols are preferred as the protic solvent.

The reaction is advantageously performed at a raised temperature, preferably at the reflux temperature of the mixture.

After reaction times of 4 to 10 hours and after the usual working up and purification, the products are obtained in purities partly greater than 95 percent and in yields greater than 90 percent.

The new compounds according to the invention are used as chain-lengthening agents or cross-linking agents for polyurethanes. But they can easily be used as hardeners for epoxy resins, as valuable intermediate products, e.g., for production of new herbicides, and as links for polyimides and triazine resins (e.g., the so-called BT resins) and polyamides. The application of the condensates according to the invention is determined both in amount and the kind of additives by the products and by the final products to be made.

Incorporation of Ames-test-negative chain-lengthening agents or cross-linking agents according to the invention in polyurethanes can take place in one of the ways usual for polyurethane production, e.g., reaction injection molding (RIM), with spread or fluidized bed dip coating, with the usual reaction systems of polyisocyanates, polyhydroxy compounds, catalysts and other additives.

Suitable polyisocyanates for this purpose are aromatic polyisocyanates, e.g., methylene-phenylene-diisocyanate (MDI), toluylenediisocyanate (TDI), naphthylenediisocyanate (NDI), para-phenylenediisocyanate (PPDI), trans-cyclohexane-1,4-diisocyanate (CHDI), metatetra-methylxylenediisocyanate (m-TMXDI), paratetramethylxylene-diisocyanate (p-TMXDI) or aliphatic and cycloaliphatic polyisocyanates, e.g., isophoronediisocyanate or hexamethylenediisocyanate.

Polyglycols as, e.g., polypropylene glycol, polytetramethylene glycol as well as polyethylene glycols including their copolymers, polyester polyols, as well as condensates from excess diols and dicarboxylic acids with molecular weights up to 5000 or polycaprolactones can be used as the polyhydroxy compounds.

Further, all usual catalysts, such as tetramethyl-butanediamine (TMBDA), diazabicyclooctane (DABCO), dibutyltindilaurate (DBTC) or also organic heavy-metal compounds, such as mercury compounds and iron acetylacetonate, individually or in combination with one another and with additives such as plasticizers, blowing agents, fire retardants or even fillers can be used.

The reaction system can be conducted according to one of the processes usual for polyurethanes. Thus, one can conduct the production according to the one-shot process or also according to the prepolymer process. Optionally, one also can proceed so that in a first step the chain-lengthening agent or cross-linking agent is dissolved in polyol and processed with the isocyanate only in a second step. If the one-shot process is used, 0.8 to 1.1 equivalents, preferably 0.9 to 1.0 equivalents, particularly preferably 0.95 to 0.98 equivalents, of the sum of —OH and —NH₂ equivalents from polyol and amine are added per equivalent of isocyanate. In the two-shot process, the chain-lengthening agent or cross-linking agent is advantageously added in amounts of 0.8 to 1.1 equivalents, preferably 0.9 to 1.0 equivalents, particularly preferably 0.95 to 0.98 equivalents, per equivalent of isocyanate.

The properties of the elastomer can be considerably modified by varying the individual parameters of the chain-lengthening agents or cross-linking agents, polyols and isocyanates.

(Swiss Application No. 3281/84 discloses Ames-test-negative condensates containing orthohalogenated diaminodiphenyl-methanes, which are also used as chain-lengthening agents or cross-linking agents for polyurethanes and epoxides.)

The following tables show the considerable improvement in the physical data of a standard elastomer obtained by the o,o'-dialkylated and metahalogenated 4,4'-methylene-bis-anilines according to the invention in comparison with the o-substituted compounds of the prior art.

TABLE 1

Examination of various 4,4'-methylene-bis-aniline derivatives as chain-lengthening agents for various polyurethane elastomers
(1) Summary of the diamines:

| 4,4'-methylene-bis | Amine No. | Production example | Ames test | Remarks |
|---|---|---|---|---|
| -(2-chloroaniline) so-called MOCA | I | Commercial product | + | Comparison substance |
| -(3-chloroaniline) | II | 12 | + | Comparison substance (non-alkylated) |
| -(3-chloro-2-methylaniline) | III | — | + | Comparison substance (mono-alkylated) |
| -(2,5-dichloro-6-ethylaniline) | IV | 10 | — | Substance acc. to invention |
| -(3-chloro-2,6-diethylaniline) | V | 1 | — | Substance acc. to invention |
| -(3-chloro-2-methyl-6-ethylaniline) | VI | 3 | — | Substance acc. to invention |
| -(5-chloro-2-methyl- | VII | 5 | — | Substance |

TABLE 1-continued

Examination of various 4,4'-methylene-bis-aniline derivatives as chain-lengthening agents for various polyurethane elastomers
(1) Summary of the diamines:

| 4,4'-methylene-bis | Amine No. | Production example | Ames test | Remarks |
|---|---|---|---|---|
| 6-isopropylaniline) | | | | acc. to invention |
| -(3-chloro-2-methyl-6-isopropylaniline) | VIII | 6 | — | Substance acc. to invention |
| -(3-chloro-2,6-di-sec-butylaniline) | IX | 7 | — | Substance acc. to invention |
| -(5-chloro-2-methyl-2-sec-butylaniline) | X | 8 | — | Substance acc. to invention |
| -(5-chloro-2-methylaniline) | XI | 11 | + | Comparison Substance |
| No M-bis-compound 3,5-diamino-4-chloro-benzoic acid sec-butyl ester | XII | Commercial product | ? | Comparison substance |

(2) Preparation of "Component A," i.e., of prepolymers with isocyanate end groups (a) On the basis of polycaprolactone and 2,4-toluylene-diisocyanate (TDI), 1000 g (0.5 mol) of polycaprolactone with a molecular weight of 2000 is heated to 100° C. and dehydrated in a vacuum of 2500 Pa for one hour. Then, it is cooled to 80° C., expanded with $N_2$ and mixed with 230 g. of 2,4-TDI (1.32 mol) during vigorous stirring. After the dying out of the exothermic reaction, it is stirred for 2 more hours at 80° C. under $N_2$. A prepolymer with a 5.6 percent content of free NCO groups is obtained. This prepolymer is designated "*PCL*-2000 *TDI*", see Table 2.

(b) Prepolymer on the basis of polytetramethylene glycol (PTMG) and 2,4-toluylenediisocyanate (TDI)

1000 g (1 mol) of PTMG with a molecular weight of 1000 is heated to 100° C. and dehydrated in a vacuum of 2500 Pa for one hour. Then, it is cooled to 80° C., expanded with $N_2$ and mixed at this temperature during good stirring with 348 g (2 mol) of 2,4-toluylenediisocyanate. After the dying out of the exothermic reaction, it is stirred for 2 more hours at 80° C. under $N_2$. A prepolymer with a 6.2 percent content of free NCO groups is obtained. This prepolymer is "*PTMG*-1000 *TDI*."

(c) Prepolymer on the basis of polycaptrolactone and methylene-bisphenylisocyanate (MDI)

1000 g (0.5 mol) of polycaprolactone with a molecular weight of 2000 is heated to 100° C. and dehydrated for an hour in a vacuum of 2500 Pa. Then it is cooled to 80° C., expanded with $N_2$ and mixed during good stirring with 400 g (1.6 mol) of MDI (mp 40° C.). After dying out of the exothermic reaction, it is stirred for 2 hours more at 80° C. under $N_2$. Thus a prepolymer with a 6.6 percent content of free NCO groups is obtained. This prepolymer is designated "*PCL*-2000 *MDI*."

(3) "Component B"

Component B is either molten diamine I to XIII or the clear, degassed solution of the amine in the appropriate polyol cooled to the working temperature (60° C.). Further, the solutions in prepolymers contain as the catalyst, 0.1 percent of mercury propionate in relation to the total system (components A+B). Component B is normally prepared as follows: the amine as melt is added drop by drop to the degassed polyol-catalyst mixture previously heated to 80° C. or the amine is dissolved therein and thoroughly mixed and cooled to 60° C.

(4) Hardening or preparation of the test pieces

Components A and B are thoroughly mixed in molar stoichiometric ratio, i.e., of NCO groups to the sum of free —OH and —$NH_2$ groups, as 1:1 at 60° C. for 10 to 15 sec., or until shortly before reaching the maximum of the pot life and then is poured into a metal mold (A1), having inside dimensions in mm of 120×100×3, previously heated to 100° C. The curing state is tested at intervals of 2 to 5 minutes in each case by penetration of a fingernail. As soon as no penetration can any longer be detected ("nail time"), it is removed from the mold ("demolding time"). The test pieces are cut from the cured elastomers.

(5) Physical tests of the elastomers or terms or abbreviations used in the tables:

| | |
|---|---|
| "Hardness" (H) | Shore hardnesses A and D according to DIN 53505 or corresponding to Shore hardness, Durometer hardness, corresponding to ASTM-D 2240 or 1706. Note: Shore "A" and "D" are basically different and are not comparable. |
| "Structural Tear Strength" (STS) | Determination according to DIN 53515, i.e., "tear strength" in N/mm, first number at 60° C., second number at 20° C. Assessment level high-temperature-resistant, especially if, moreover, difference, small: "structurally solid." |
| "Rebound" (RB) | (= rebound) according to DIN 53512 in percent corresponds approximately to "falling ball rebound" according to ASTM-D 1054. |
| "nc" | "not cracked" |
| "Tensile stress" ("TS") | Tensile strength in $N/mm^2$ according to DIN 53455 |
| "MP" | Mol portion of the amines in component B (rest for 1.0 polyol) |
| "PW" | Portion by weight of component B in parts by weight (amine + polyol) in relation to 100 parts of component A (prepolymer) |
| "PL" | Pot life, definition see point 4 |
| "NT" | Nail time (Demolding time, see point 4) |

TABLE NO. 2

(6) Results with prepolymer "PCL-2000 TDI"

| Amine A No. | A in comp B mol % | PW comp B vs 100 comp A | PL Pot Life | NT Nail Time | H Shore A or D | STS 60° | N/mm 20° | RB % | TS N/mm² | Remarks |
|---|---|---|---|---|---|---|---|---|---|---|
| II   | 100 | 18.7 | 33"   | 5'    | 85A | 8  | 33 | 24 | 19.3 | Comp. |
| II   | 66  | 56   | 30"   | 30'   | 63A | 5  | 35 | 40 | 21.1 | Comp. |
| XI   | 100 | 21   | 30"   | 29'   | 42D | 37 | 68 | 29 | 20.5 | Comp. |
| XI   | 66  | 60   | 30"   | 35'   | 82A | 29 | 57 | 41 | 30.6 | Comp. |
| IV   | 66  | 61   | 1'10" | 25'   | 89A | 55 | 75 | 47 | 35.5 | Inven. |
| V    | 66  | 58   | 1'30" | 53'   | 86A | 38 | 58 | 47 | 37.1 | Inven. |
| VI   | 66  | 56   | 1'10" | 40'   | 87A | 53 | 62 | 48 | 36.1 | Inven. |
| VIII | 66  | 57.5 | 1'05" | 25'   | 87A | 31 | 61 | 44 | 32.8 | Inven. |

TABLE NO. 3

(7) Results with prepolymers "PTMG-1000 TDI"

| Amine A No. | A in comp B mol % | PW comp B vs 100 comp A | PL Pot Life | NT Nail Time | H Shore A or D | STS 60° | N/mm 20° | RB % | TS N/mm² | Remarks |
|---|---|---|---|---|---|---|---|---|---|---|
| I   | 100 | 18.7 | 5'       | 44'     | 47D | 39 | 72 | 35 | 34.0 | Comp. |
| XII | 100 | 17   | 34'(!)   | 120'(!) | 48D | 52 | 93 | 36 | 32.3 | Comp. |
| V   | 100 | 19.5 | 2'30"    | 23'     | 55D | 79 | 84 | 37 | 30.0 | Inven. |
| V   | 80  | 35   | 3'       | 28'     | 43D | 51 | 87 | 39 | 35.9 | Inven. |
| X   | 100 | 27   | 2'30"    | 16'     | 44D | 32 | 52 | 35 | 24.4 | Inven. |
| IX  | 100 | 33   | 3'10"    | 18'     | 48D | 32 | 67 | 40 | 28.5 | Inven. |

TABLE NO. 4

(8) Results with prepolymers "PCL-2000 MDI"

| Amine A No. | A in comp B mol % | PW comp B vs 100 comp A | PL Pot Life | NT Nail Time | H Shore A or D | STS 60° | N/mm 20° | RB % | TS N/mm² | Remarks |
|---|---|---|---|---|---|---|---|---|---|---|
| V   | 100 | 30 | 20" | 5' | 55D | 61 | 74 | 42 | 25.6 | Inven. |
| V   | 66  | 72 | 19" | 9' | 88A | 37 | 64 | 45 | 35.1 | Inven. |
| III | 66  | 70 | 18" | 9' | 84A | 16 | 31 | 42 | 14.3 | Comp. |
| VII | 66  | 67 | 22" | 7' | 87A | 22 | 38 | 45 | 24.1 | Curing at 70° C. Inven. |

EXAMPLE 1

4,4'-Methylene-bis-(3-chloro-2,6-diethylaniline) 455.0 g (2.477 mol) of 3-chloro-2,6-diethylaniline 460.0 g of xylene (technical isomeric mixture) were placed in the reaction flask, and 58.0 g of 53 percent $H_2SO_4$ was added thereto drop by drop with stirring. Then it was heated to about 94° C. and, during vigorous stirring, 113.0 g (1.197 mol) of 31.8 percent formalin was evenly metered in over a period of 10 minutes (96.6 equiv. percent, in relation to the aniline). After that it was stirred for 7 hours at reflux temperature, and then 60.0 g of 50 percent of sodium hydroxide solution was metered in and stirred for an additional 30 minutes. Then the stirring was interrupted and, after layer removal, the aqueous phase was decanted. It was washed twice with 150 ml of water, each at roughly 90° C.

The solvent was first flashed off from the washed reaction product under normal pressure. After that, the temperature and vacuum were continuously raised to remove the last residues of the low-boiling components (mainly educt). To bring the educt content in the residue to below 0.1 percent, final conditions of 225° C./2 mbar were necessary. The residue corresponded to the desired product. The solvent and flashed educt were able to be reused.

Result: 435.0 g of final product, which is 95.8 percent content as shown by GC 96 percent; the product easily crystallized; melting point was between 80° and 90° C.

NMR: ($CDCl_3$) δ 1.1-1.2 (t,t, 12 H, 4—$CH_3$—$CH_2$); 2.4 (q 4H, 2—$CH_2$—$CH_3$); 2.8 (q, 4H, 2—$CH_2$—$CH_3$); 3.6 (s, 4H, 2—$NH_2$); 4.02 (s, 2H, arom—$CH_2$—arom); 6.6 (s, 2H, 2—arom—H);

IR: (thin film) $cm^{-1}$ 3500-3300 (m), 2967, 2934, 2873 (vs), 1620, 1450 (vs), 1297 (m), 1056 (m), 886 (m), 757 (m).

No exotherm of the product at 350° C. over 8 hours could be determined or detected.

EXAMPLE 2

4,4'-Methylene-bis-(5-chloro-2-methyl-6-ethylaniline)

130.0 g (0.766 mol) of 5-chloro-2-methyl-6-ethylaniline and 150.0 g of xylene (technical isomeric mixture) were placed in the reaction flask, and 16.6 g of 63 percent $H_2SO_4$ was added thereto drop by drop with stirring. Then it was heated to about 94° C. and, during vigorous stirring, 34.6 g (0.363 mol) of 31.5 percent formalin was evenly metered in over a period of 10 minutes (94.8 equiv. percent, in relation to the aniline). The reaction temperature soon adjusted itself to the boiling temperature of the azeotropic mixture of xylene/water of 94° C. The reaction conditions (reflux/vigorous stirring) were maintained for 7 hours, and then 17.0 g of 50 percent sodium hydroxide solution was added and stirred for another 30 minutes. Phase separation, washing (twice with 150 ml of water) and working up by distillation took place analogously to Example 1. The solvent and flashed educt could be reused.

Result: 125.0 g of final product, which is 98.8 percent, content as shown by GC 96 percent; the product was crystalline; and the melting point was between 143° and 148° C.

NMR: (CDCl₃) δ 1.2 (t, 6H, 2 CH₃—CH₂); 2.1 (s, 6H, 2CH₃—arom); 2.8 (q, 4H, 2—CH₂—CH₃); 3.6 (s, 4H, 2—NH₂); 4.0 (s, 2H, arom—CH₂—arom); 6.6 (s, 2H, 2—arom—H);

IR: (thin film) cm⁻¹ 3500–3300 (m), 2969, 2932, 2873 (s), 1620 (vs), 1470, 1442 (vs), 1301 (m), 987 (s), 756 (s).

No exotherm of the product at 350° C. over 8 hours could be determined or detected.

EXAMPLE 3

4,4'-Methylene-bis-(3-chloro-2-methyl-6-ethylaniline)

130.0 g (0.766 mol) of 3-chloro-2-methyl-6-ethylaniline and 150.0 g of xylene (technical isomeric mixture) were placed in the reaction flask, and 16.6 g of 53 percent H₂SO₄ was added thereto drop by drop with stirring. After heating to 94° C., during vigorous stirring 32.9 g (0.346 mol) of 31.6 percent formalin was evenly metered over a period of 10 minutes (90.4 equiv. percent, in relation to the aniline). The reaction temperature soon adjusted itself to the boiling temperature of the azeotropic mixture of xylene/water of about 94° C. The reaction conditions (reflux/vigorous stirring) were maintained for 7 hours, and then 17.0 g of 50 percent sodium hydroxide solution was added and stirred for another 30 minutes. After that, phase separation, washing (twice with 150 ml of water each) and working up by distillation took place analogously to Example 1. The solvent and flashed educt could be reused.

Result: 117.0 g of final product, which is 96.3 percent, content as shown by GC 96 percent; the product was crystalline; and the melting point was between 115° and 117° C.

NMR: (CDCl₃) δ 1.18 (t, 6H, 2 CH₃—CH₂); 2.3 (s, 6H, 2 CH₃—arom); 2.42 (q, 4H, 2—CH₂—CH₃); 3.62 (s, 4H, 2—NH₂); 4.2 (s,2H, arom—CH₂—arom); 6.62 (s, 2H,2—arom—H);

IR: (thin film) cm⁻¹ 3500–3300 (m), 2965, 2934, 2874 (s), 1622 (vs), 1469 (vs), 1438 (vs), 1012(s).

No exotherm of the product at 350° C. over 8 hours could be determined or detected.

EXAMPLE 4

4,4'-Methylene-bis(3-chloro-2,6-diisopropylaniline)

130.0 g (0.61 mol) of 3-chloro-2,6-diisopropylaniline and 120 g of 1-butanol were placed in the reaction flask and heated to 65° C. At this temperature 66.0 g of 53 percent H₂SO₄ was added drop by drop with stirring. After raising of the temperature to 93° C., 29.2 g (0.3 mol) of 31.6 percent formalin was evenly metered in over 10 minutes with vigorous stirring (100.1 equiv. percent, in relation to the aniline). The reaction temperature soon adjusted itself to the boiling point of the azeotropic mixture of 1-butanol/water of 93° C. The reaction conditions (reflux/vigorous stirring) were maintained for 5 hours, and then 80.0 g of 50 percent sodium hydroxide solution was added and stirred for another 30 minutes. Phase separation, washing (twice with 150 ml of water) and working up by distillation took place with the solvent 1-butanol basically according to Example 1. The solvent and flashed educt could be reused.

Result: 125.0 g of final product, which is 95.6 percent, content as shown by GC 91 percent; and the product was a brown, solid melt with a softening range around 50° to 60° C.

NMR: (CDCl₃) δ 1.15 (d, 12H (CH₃)₂—CH—); 1.23 (d, 12H, 2 (CH₃)₂—CH); 2.82 (m, 2H, 2—CH—(CH₃)₂); 3.8 (s, 4H, 2—NH₂); 4.0 (s, 2H, arom—CH₂—arom); 3.9–4.1 (broad, 2H, 2—CH—(CH₃)₂); 6.6 (s, 2H, 2 arom—H);

IR: (thin film) cm⁻¹ 3500–3330 (m), 2961, 2932, 2873 (vs), 1620, 1463, 1442 (vs), 1342, 1081, 759 (m).

An exotherm after 3 hours at 350° C. could be determined.

EXAMPLE 5

4,4'-Methylene-bis-(5-chloro-2-methyl-6-isopropylaniline)

130.0 g (0.708 mol) of (5-chloro-2-methyl-6-isopropyl-aniline and 120 g of 1-butanol were placed in the reaction flask and heated to 80° C. and 66 g of 53% sulfuric acid was added. After raising of the temperature to 93° C., 35.3 g (0.372 mol) of 31.6 percent formalin was evenly metered in over 10 minutes with vigorous stirring (105 equiv. percent, in relation to the aniline). The reaction temperature soon adjusted itself to the boiling point of the azeotropic mixture of 1-butanol/water of 93° C. The reaction conditions (reflux/vigorous stirring were maintained for 5 hours, and then 80.0 g of 50 percent sodium hydroxide solution was added and stirred for another 30 minutes. Phase separation, washing and working up by distillation took place as Example 4. The solvent and flashed educt could be reused.

Result: 130.0 g of final product, which is 96.8 percent, content as shown by GC 89 percent; and the product was brown, solid melt with a softening range around 75° to 95° C.

NMR: (CDCl₃) δ 1.4 (d,12H, 2 (CH₃)₂—CH); 2.08 (s, 6H, 2 CH₃—arom); 3.7 (s, 4H, 2—NH₂); 4.0 (s, 2H, arom—CH₂—arom); 3.9–4.1 (broad, 2H, —CH—(CH₃)₂); 6.58 (s, 2H, 2 arom—H);

IR: (thin film) cm⁻¹ 3500, 3410 (m), 2964, 2931, 2872 (vs), 1619, 1470, 1439 (vs), 1349, 1321. 1214 (m), 1000, 983 (m), 759 (s).

No exotherm up to 320° C. could be determined.

EXAMPLE 6

4,4'-Methylene-bis(3-chloro-2-methyl-6-isopropylaniline)

130.0 g (0.71 mol) of 3-chloro-2-methyl-6-isopropylaniline and 120 g of 1-butanol were placed in the reaction flask and heated to 80° C. and 66.0 g of 53 percent H₂SO₄ was added drop by drop with stirring. Then at 93° C., 33.0 g (0.35 mol) of 31.6 percent formalin was evenly metered in over 10 minutes with vigorous stirring (98 equiv. percent, in relation to the aniline). The reaction temperature soon adjusted itself to the boiling point of the azeotropic mixture of 1-butanol/water of 93° C. The reaction conditions (reflux/vigorous stirring) were maintained for 5 hours, then 80.0 g of 50 percent sodium hydroxide solution was added and stirred for another 30 minutes. Phase separation, washing and working up by distillation took place as Example 4. The solvent and flashed educt could be reused.

Result: 129.0 g of final product, which is 98 percent referring to formalin, content as shown by GC 95 percent; and the product was crystalline and had a melting point of between 118° and 120° C.

NMR: (CDCl$_3$) δ 1.5 (d, 12H, 2 (CH$_3$)$_2$—CH); 2.3 (s, 6H, 2 CH$_3$—arom); 2.8 (m, 2H, 2—CH—(CH$_3$)$_2$); 3.65 (s, 4H, 2—NH$_2$); 4.02 (s, 2H, arom—CH$_2$—arom); 6.75 (s, 2H, 2 arom—H);

IR: (thin film) cm$^{-1}$ 3500–3300 (m), 2961, 2929, 2871 (vs), 1621, 1468, 1434 (vs), 1198, 1081, 1017, 971, 752 (m).

No exotherm of the product at 350° C. during 8 hours could be determined or detected.

EXAMPLE 7

4,4'-Methylene-bis-(3-chloro-2,6-di-sec-butylaniline)

130.0 g (0.542 mol) of 3-chloro-2,6-di-sec-butylaniline and 120 g of 1-butanol were placed in the reaction flask and heated to above 80° C. and 66.0 g of 53 percent H$_2$SO$_4$ was added drop by drop with stirring. After raising of the temperature to 93° C., 25.8 g (0.272 mol) of 31.6 percent formalin was evenly metered in over 10 minutes with vigorous stirring (100.2 equiv. percent, in relation to the aniline). The reaction temperature soon adjusted itself to the boiling point of the azeotropic mixture of 1-butanol/water of 93° C. The reaction conditions (reflux/vigorous stirring) were maintained for 5 hours, and then 80.0 g of 50 percent sodium hydroxide solution was added and stirred for another 30 minutes. Phase separation, washing and working up by distillation took place analogously to Example 4. The solvent and flashed educt could be reused.

Result: 123.0 g of final product, which is 92.0 percent referring to formalin, content as shown by GC 93 percent; and the product was a brown, highly viscous mass.

NMR: (CDCl$_3$) δ 0.8 (m. 6H, 2 CH$_3$—CH$_2$—); 0.9 (m. 6H, 2 CH$_3$—CH$_2$—); 1.1 (d, 6H, 2 CH$_3$—CH—); 1.4 (d, 6H, 2 CH$_3$—CH); 1.4–1.6 (m, 4H); 1.9–2.0 (m, 4H); 2.55 (m. 2H); 3.7 (s, 4H, 2—NH$_2$); 3.8–4.1 (m, 4H, arom—CH$_2$—arom); 6.5 (s, 2H, 2 arom—H);

IR: (thin film) cm$^{-1}$ 3500–3300 (m), 2962, 2931, 2873 (vs), 1619, 1443 (s).

No exotherm of the product at 350° C. during 8 hours could be determined or detected.

EXAMPLE 8

4,4'-Methylene-bis(5-chloro-2-methyl-6-sec-butylaniline)

149.0 g (0,754 mol) of 5-chloro-2-methyl-6-sec-butylaniline and 137.0 g of 1-butanol were placed in the reaction flask and heated to above 80° C. and 76.0 g of 53 percent H$_2$SO$_4$ was added drop by drop with stirring. After heating to 93° C., 35.0 g (0,368 mol) of 31.6 percent formalin was evenly metered in over 10 minutes with vigorous stirring (97.7 equiv. percent, in relation to the aniline). The reaction temperature soon adjusted itself to the boiling point of the azeotropic mixture of 1-butanol/water of 93° C. The reaction conditions (reflux/vigorous stirring) were maintained for 5 hours, and then 91.0 g of 50 percent sodium hydroxide solution was added and stirred for another 30 minutes. Before phase separation 100 ml of water had to be added so that the Na$_2$SO$_4$ would dissolve completely. After that, phase separation, washing and working up by distillation took place analogously to Example 4. The solvent and flashed educt could be reused.

Result: 134.0 g of educt, which is 89,4 percent content as shown by GC 91 percent; and the product was a brown, solid melt with a softening range of 55° to 65° C.

NMR: (CDCl$_3$) δ 0.9 (t, 6H, 2 CH$_3$—CH$_2$); 1.4 (d, 6H, 2 CH$_3$—CH); 1.7–1.9 (m, 4H, 2—CH$_2$—CH$_3$) 2.05 (s, 6H, 2—CH$_3$—arom); 3.65 (s, 4H, 2—NH$_2$); 3.8 (m, 2H, 2—CH—(CH$_3$)—CH$_2$—CH$_3$); 4.0 (s, 2H, arom—CH—2—arom); 6.55 (s, 2H, 2 arom—H);

IR: (thin film) cm$^{-1}$ 3500–3300 (s), 2961, 2930, 2871 (vs), 1619, 1469, 1439 (vs), 1000, 982 (s)

No exotherm of the product up to 340° C. could be determined or detected.

EXAMPLE 9

4,4'-Methylene-bis(3-chloro-2-methyl-6-sec-butylaniline)

130.0 g (0.66 mol) of 3-chloro-2-methyl-6-secbutylaniline and 120.0 g of 1-butanol were placed in the reaction flask and heated to above 80° C. and 66.0 g of 53 percent H$_2$SO$_4$ was added drop by drop with stirring. After that 31.2 g (0.33 mol) of 31.6 percent formalin was evenly metered in over 10 minutes at 93° C. (99.9 equiv. percent, in relation to the aniline). The reaction temperature soon adjusted itself to the boiling point of the azeotropic mixture of 1-butanol/water of 93° C. The reaction conditions (reflux/vigorous stirring) were maintained for 5 hours, then 80.0 g of 50 percent sodium hydroxide solution was added and stirred for another 30 minutes. Phase separation, washing and working up by distillation took place analogously to Example 4. The solvent and flashed educt could be reused.

Result: 124.0 g of final product, which is 92.6 percent, content as shown by GC 94 percent; the product was a brown, solid melt with crystalline portions; and the melting point was 94° to 102° C.

NMR: (CDCl$_3$) δ 0.8 (t, 6H, 2 CH$_3$—CH$_2$); 1.2 (d, 6H, 2 CH$_3$—CH—); 1.5 (m, 4H, 2—CH$_2$—CH$_3$); 2.3 (s, 6H, 2 CH$_3$—arom); 2.55 (m, 2H, 2—CH—(CH$_3$)—CH—2—CH$_3$); 3.6 (s, 4H, 2—NH$_2$); 4.05 (m, 2H, arom—CH—2—arom)—; 6.6 (s, 2H, 2 arom—H);

IR: (thin film) cm$^{-1}$ 3500–3300 (s), 2967, 2931, 2872 (vs), 1622, 1469, 1435 (vs), 1378, 1320, 1195, 1017, 1000 (m), 752 (m).

An exotherm after 2 hours at 350° C. could be determined.

EXAMPLE 10

4,4'-Methylene-bis(2,5-dichloro-6-ethylaniline)

130.0 g of 2,5-dichloro-6-ethylaniline in 120 g of 1-butanol was heated to about 40° C. and during stirring was mixed with 66 g of 53 percent sulfuric acid. Then at about 90° C., 32.5 g of 31.6 percent formalin was evenly metered in over 10 minutes at about 90° C. (100 equiv. percent, in relation to the aniline). The reaction temperature soon adjusted itself to the boiling point of the azeotropic mixture of 1-butanol/water of 93° C. The reaction conditions (reflux/vigorous stirring) were maintained for 5 hours, then 160 g of 25 percent NaOH was added and stirred for another 30 minutes. After that, it was cooled to 50° C. and the solid product filtered off and rewashed with a little water. The filter cake was then suspended in 500 ml of water and stirred for 10 minutes at 50° C. After filtration, this operation was repeated once. It was dried at 100° C./26.6 mbar to constant weight.

Result: 113.9 g of final product, content about 97 GC-F1 percent; the product is crystalline; and has a melting point of 146° to 148° C.

NMR: (CDCl$_3$) δ 1.18 (t, 6H, 2 CH$_3$—CH$_2$); 2.78 (g, 4H, 2 CH$_2$—CH$_3$); 3.98 (s, 2H, arom—CH$_2$—arom); 4.10 (s, 4H, 2—NH$_2$); 6.78 (s, 2H, 2—arom—H);

IR: (KBr): cm$^{-1}$ 3300–3500 (s), 2969, 2929, 2874 (s), 1616 (vs), 1448, 1429 (vs), 1401 (m), 1281 (m).

An exotherm at 350° C. could be determined.

EXAMPLE 11

4,4'-Methylene-bis(5-chloro-2-methylaniline)

130.0 g of 5-chloro-2-methylaniline in 170 g of 1-butanol was heated to 50° C. and during stirring was mixed with 66 g of 53 percent sulfuric acid. Then 42.7 g of 30.2 percent formalin was evenly metered in over 10 minutes at about 90° C. (100 equiv. percent, in relation to the aniline). The reaction temperature soon adjusted itself to the boiling point of the azeotropic mixture of 1-butanol/water of 93° C. The reaction conditions (reflux/vigorous stirring) were maintained for 5 hours, then 180 g of 22 percent NaOH was added and stirred for another 30 minutes. Phase separation, washing (twice with 150 ml of water) and working up by distillation took place analogously to Example 10. The solvent and flashed educt could be reused.

Result: 83 g of final product, whose equivalent weight was more than 11 percent above the theoretical value; and the substance was present as a solid melt and had a melting range of 56° to 60° C.

EXAMPLE 12

4,4'-Methylene-bis(3-chloroaniline)

130 g of 3-chloroaniline in 120 g of 1-butanol was heated to 50° C. and during stirring was mixed with 66 g of 53 percent sulfuric acid. Then 45.5 g of 31.6 percent formalin was evenly metered in over 10 minutes at about 90° C. (94 equiv. percent in relation to the aniline). The reaction temperature soon adjusted itself to the boiling point of the azeotropic mixture of 1-butanol/water of 93° C. The reaction conditions (reflux/vigorous stirring) were maintained for 5 hours, then 120 g of 33 percent NaOH was added and stirred for another 30 minutes. Phase separation, washing (twice with 150 ml of water) and working up by distillation took place analogously to Example 10. The solvent and flashed educt could be reused.

Result: 85 g of final product, whose equivalent weight was more than 10 percent above the theoretical value; and the substance was present as a solid melt and had a melting range of 40° to 60° C.

What is claimed is:

1. A 4,4-methylene-bis(3-chloro-2,6-diethylaniline) of the formula:

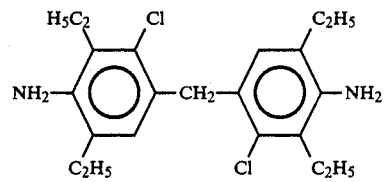

said chain-lengthening agent or cross-linking agent being non-mutagenic.

2. A 4,4-methylene-bis(3-chloro-2,6-diethylaniline) of the formula:

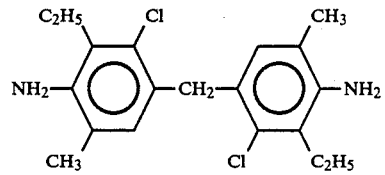

said chain-lengthening agent or cross-linking agent being non-mutagenic.

3. A 4,4'-methylene-bis(3-chloro-2,6-diethylaniline) of the formula:

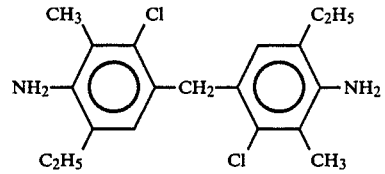

said chain-lengthening agent or cross-linking agent being non-mutagenic.

4. A 4,4'-methylene-bis(metachlor-2,6-dialkylaniline) of the formula:

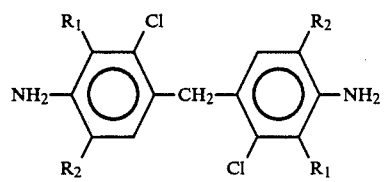

wherein $R_1$ and $R_2$ is ethyl or $R_1$ and $R_2$ are different and are selected from the group consisting of methyl or ethyl.

* * * * *